United States Patent [19]

Kaschak

[11] 3,998,530
[45] Dec. 21, 1976

[54] ANGULARLY MOVABLE MIRROR ASSEMBLY

[75] Inventor: Michael Kaschak, Glen Burnie, Md.

[73] Assignee: Westinghouse Electric Corporation, Pittsburgh, Pa.

[22] Filed: July 28, 1975

[21] Appl. No.: 599,491

[52] U.S. Cl. .............................. 350/310; 248/476; 350/285; 350/288

[51] Int. Cl.² ........................................ G02B 5/08

[58] Field of Search ................ 350/6, 7, 285, 288, 350/289, 304, 307, 310; 248/473, 474, 477, 476, 479, 488

[56] References Cited

UNITED STATES PATENTS 1,969,415  8/1934  Ostroff ............................ 350/304
3,612,647  10/1971  Laprairie ....................... 350/288 X
3,656,830  4/1972  Kurschner ..................... 350/288 X

FOREIGN PATENTS OR APPLICATIONS 1,466,751  12/1966  France ............................. 248/479

Primary Examiner—John K. Corbin
Assistant Examiner—F. L. Evans
Attorney, Agent, or Firm—D. F. Straitiff

[57] ABSTRACT

A planar mirror is mounted on a narrow rotary shaft-like support member without use of a wide distributed backing member, for low inertia angular movement about the axis of such shaft. A resilient material is interposed between the mirror and the shaft for antidistortion stress-free support.

3 Claims, 3 Drawing Figures

ANGULARLY MOVABLE MIRROR ASSEMBLY

BACKGROUND OF THE INVENTION

1. Field of the Invention

Angularly (movable) mirror assemblies such as used in electro-optical devices on certain air or space craft for maintaining a line of sight to a target.

2. Description of the Prior Art

Although no pre-examination novelty search has been conducted, previous mirror assemblies for airborne target-sight-maintaining use are known to have employed planar mirrors rigidly affixed at distributed locations to a relatively wide platform or backing member angularly movable about the axis of a shaft secured to such platform. The rigid and distributed affixation of the mirror to the platform, applicant discovered, tended to warp the mirror and degrade its pointing accuracy. The mass of the platform to which the mirror was affixed required the use of considerable amount of counterweight material that contributed to a high level of weight and inertia. Excess weight in airborne equipment is always undesirable, and the relatively high inertia tended to introduce some degradation in mirror-movement performance.

SUMMARY OF THE INVENTION

The present invention, in mounting the mirror directly on the shaft, rather than on a frame or platform, greatly reduces the weight and inertia of the assembly, while the use of elastomeric material in interposition between the mirror and the shaft on which it is mounted eliminates the warping caused by the rigid affixation of the prior art.

DESCRIPTION OF A PREFERRED EMBODIMENT

Figure 1:
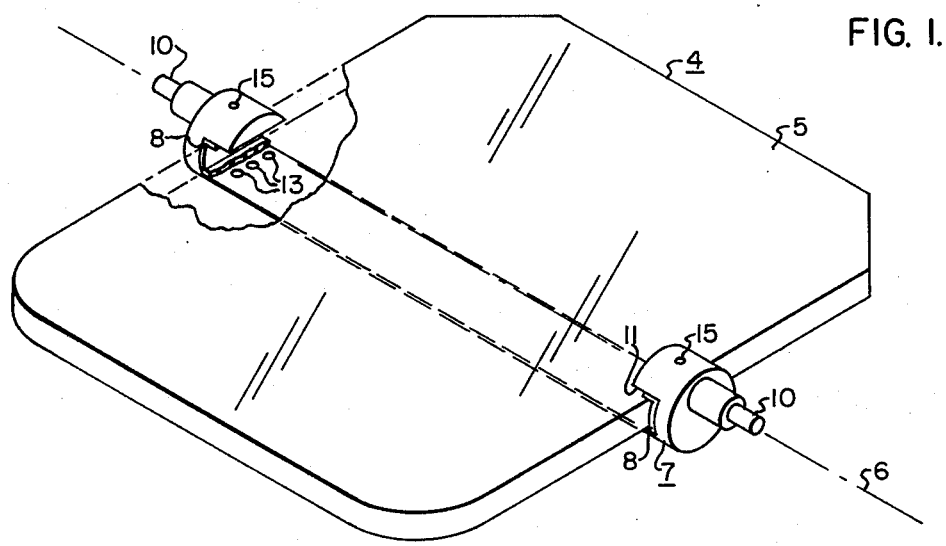
FIG. 1 is a three-dimensional view of the mirror assembly of the present invention; and, FIGS. 2 and 3 are cross-sectional views of a portion of the assembly of FIG. 1, showing details involved in several steps of fabrication of such assembly.

Referring to FIG. 1, the improved mirror assembly of the present invention comprises a planar mirror 4 having its front face 5 (uppermost in FIG. 1) silvered for reflection of light-image information to a sensor means, not shown. Angular movement of the mirror 4 occurs about an axis 6 that extends transversely across the reflecting face 5 and lies in the same plane. Axis 6 is located substantially midway between opposite ends of the mirror for balance.

In accord with the novel features of the present invention, the mirror 4 is supported for angular movement about the transverse axis 6 by a shaft-like member 7 through the medium of resilient members 8 of elastomeric material. The shaft-like mirror support member 7 extends across the back or non-silvered face 9 of the mirror to reduced diameter end sections 10 adapted for rotary support by means, not shown. Any upper portion of the shaft-like mirror support member, as viewed in FIG. 1, exists only at end sections 10 near the mirror edges to avoid obstruction of the reflecting surface 5 of such mirror. Notches 11 are formed in the large-diameter part of member 7 adjacent to the end sections 10 to accept the edges of the mirror 4 with clearance for disposition of the resilient members 8 at the mirror edges as well as at opposite faces. The mirror thereby finds localized support along the axis 6 at its opposite edges only through the medium of such resilient members 8. By virtue of this arrangement, no significant strain is imparted to the mirror and any significant warping or distortion of the reflector surface 5 is avoided, both statically as well as dynamically during angular movement of the mirror through turning of member 7 via such as pulley means, not shown.

Figure 2:
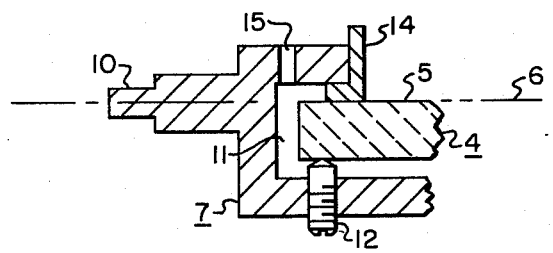
Figure 3:
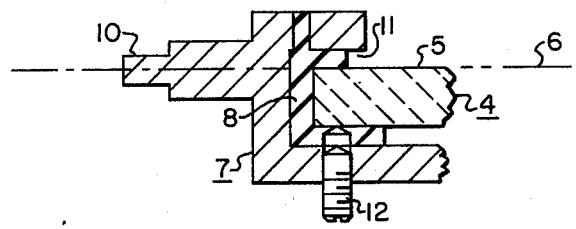

Referring to FIG. 2, it is preferable that the resilient support member 8 be formed in place during assembly of the mirror. To facilitate this, the member 7 is provided at each end with three nylon-tipped set screws 12, only one of which is shown in FIG. 2, but the three holes 13 for which are shown in FIG. 1. These set screws are screwed in upwardly from the bottom of the shaft-like member 7 at its opposite ends to define the bottom thicknesswise clearance between mirror 4 and member 7 in the region of the slots 11, while the top such clearance is fixed by a removable shim 14. Shim 14 also closes off the otherwise open end of the slot 11. Filler ports 15 provide for injection of the elastomeric material such as silicone rubber, RTV, or the like in liquid or flowable form (not shown) into the slots 11 around the edges of the mirror 4. Once the material has cured to its non-liquid rubber-like form as resilient members 8, one of which is shown in FIG. 3, the nylon-tipped set screws 12 can be unscrewed and withdrawn from the threaded holes 13, together with removal of the shims 14, thereby completing the mirror assembly.

What is claimed is:

1. An improved angularly movable mirror assembly for airborne use, comprising, a planar mirror having a reflector surface, a relatively narrow elongated rigid support member extending across the back of said mirror midway between its opposite ends, said rigid support member being adapted for turning movement about a rotary axis extending along its length and in the plane of said reflector surface, and formed-in-place resilient members of elastomeric material interposed between said rigid support member and said mirror, as a support and motion-coupling intermediary.

2. The mirror assembly as set forth in claim 1, wherein said rigid support member has slots at longitudinally-spaced-apart locations contiguous to opposite edges of said mirror, and said resilient members are disposed in said slots.

3. The mirror assembly of claim 2, wherein said rigid support member is adapted to accept removable means for temporary support of said mirror with clearance in said slots and to receive elastomeric material in flowable form into such clearance to form said resilient members.

* * * * *